(12) United States Patent
Oda

(10) Patent No.: US 9,927,903 B2
(45) Date of Patent: Mar. 27, 2018

(54) VEHICULAR INPUT DEVICE

(71) Applicant: DENSO CORPORATION, Kariya, Aichi-pref. (JP)

(72) Inventor: Yusuke Oda, Gamagori (JP)

(73) Assignee: DENSO CORPORATION, Kariya (JP)

( * ) Notice: Subject to any disclaimer, the term of this patent is extended or adjusted under 35 U.S.C. 154(b) by 296 days.

(21) Appl. No.: 14/747,268

(22) Filed: Jun. 23, 2015

(65) Prior Publication Data
US 2015/0370405 A1 Dec. 24, 2015

(30) Foreign Application Priority Data

Jun. 24, 2014 (JP) ................... 2014-129089

(51) Int. Cl.
| | | |
|---|---|---|
| *G06F 15/00* | (2006.01) | |
| *G06F 13/00* | (2006.01) | |
| *G06F 3/041* | (2006.01) | |
| *G06F 3/044* | (2006.01) | |
| *G06F 3/0481* | (2013.01) | |
| *G06F 3/0482* | (2013.01) | |
| *G06F 3/0484* | (2013.01) | |
| *B60K 37/06* | (2006.01) | |
| *G06F 3/01* | (2006.01) | |

(52) U.S. Cl.
CPC ............ *G06F 3/0416* (2013.01); *B60K 37/06* (2013.01); *G06F 3/017* (2013.01); *G06F 3/044* (2013.01); *G06F 3/0482* (2013.01); *G06F 3/04817* (2013.01); *G06F 3/04842* (2013.01); *B60K 2350/1012* (2013.01); *B60K 2350/1052* (2013.01); *G06F 2203/04101* (2013.01)

(58) Field of Classification Search
CPC .............................. B60W 30/20; E05F 15/46
USPC ........................................ 715/700; 701/1, 36
See application file for complete search history.

(56) References Cited

U.S. PATENT DOCUMENTS

| | | | |
|---|---|---|---|
| 2010/0090982 A1 | 4/2010 | Oba et al. | |
| 2011/0279364 A1 | 11/2011 | Koshiyama et al. | |
| 2013/0194174 A1 | 8/2013 | Bondan et al. | |
| 2013/0311039 A1* | 11/2013 | Washeleski | E05F 15/46 701/36 |
| 2014/0018974 A1* | 1/2014 | Okita | B60W 30/20 701/1 |

(Continued)

FOREIGN PATENT DOCUMENTS

JP 2009-258903 A 11/2009

OTHER PUBLICATIONS

U.S. Appl. No. 14/747,245, filed Jun. 23, 2015, Denso Corp; Mazda Motor Corp.

*Primary Examiner* — Kevin Nguyen
(74) *Attorney, Agent, or Firm* — POSZ Law Group, PLC

(57) ABSTRACT

The present disclosure provides a vehicular input device including: a capacitance sensor mounted to a vehicle providing a plurality of first conductors lined up in a vehicular front-back direction; and a control unit for estimating the separation distance between the capacitance sensor and a driver's finger based on the amount of an electrical charge in a part of the plurality of first conductors arranged at the back side of a vehicle and also estimating the front-back position of the driver's finger on the capacitance sensor based on the difference of an electrical charge respectively stored in each of the plurality of first conductors.

7 Claims, 5 Drawing Sheets

(56) References Cited

U.S. PATENT DOCUMENTS

| | | | |
|---|---|---|---|
| 2015/0066238 A1* | 3/2015 | Todd | B60K 28/063 701/1 |
| 2015/0116213 A1 | 4/2015 | Bondan et al. | |
| 2015/0367729 A1 | 12/2015 | Oda et al. | |

* cited by examiner

US 9,927,903 B2

VEHICULAR INPUT DEVICE

CROSS REFERENCE TO RELATED APPLICATIONS

This application is based on Japanese Patent Application No. 2014-129089 filed on Jun. 24, 2014, the disclosure of which is incorporated herein by reference.

TECHNICAL FIELD

The present disclosure relates to an input device used in a vehicle.

BACKGROUND

It has been proposed to provide a technique for detecting a detection object such as a finger which has not yet touched a capacitance sensor based on a change in an electrical charge stored in the capacitance sensor (for example, see Patent Document 1).

The output of the capacitance sensor is dependent on the distance between the capacitance sensor and a detection object as well as the opposite area between the detection object and the capacitance sensor; therefore, it is difficult to determine whether the distance from the detection object is shorter or whether the opposite area between the capacitance sensor and the detection object is larger only based on the amount of an electrical charge stored in the capacitance sensor.

[Patent Document 1] Japanese Patent No. 4766340

SUMMARY

The present inventor of the present disclosure considers that the part opposite to the edge at the front side of a capacitance sensor (i.e., at the back side of a vehicle) when a driver extending his or her hand or finger toward the capacitance sensor mainly focuses on the side of the fingertip or the palm of the driver's hand, it is possible to use a predetermined constant number as the opposite area between the side of the fingertip and the capacitance sensor or between the palm of the driver's hand and the capacitance sensor.

According to an aspect of the present disclosure, a capacitance sensor is configured by a plurality of first conductors lined up at least in a vehicular front-back direction. The present disclosure estimates the distance between the capacitance sensor and a driver's hand based on an electrical charge stored in a part of the plurality of first conductors mainly arranged at the back side of a vehicle. Accordingly, the distance between capacitance sensor and the driver's fingertip can be estimated with a higher accuracy.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
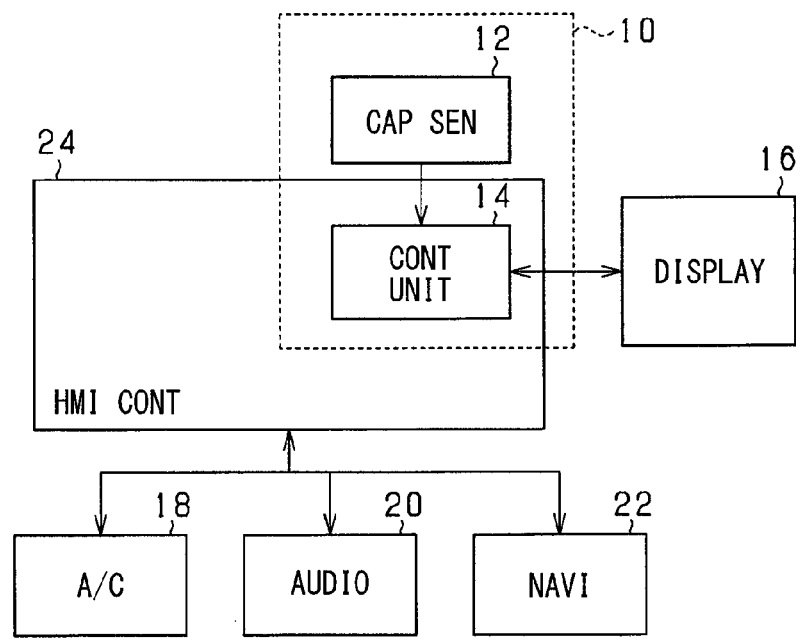
FIG. 1 is a block diagram that shows an I/O relation regarding a signal of a vehicular apparatus including a vehicular input device according to a first embodiment.

A first embodiment of the present disclosure is described with reference to FIGS. 1 through 5. FIG. 1 is a block diagram that shows an I/O relation regarding a signal of a vehicular apparatus including an input device 10 according to the present embodiment. The input device 10 according to the present embodiment is configured by a capacitance sensor 12 and a control unit 14. The capacitance sensor 12 is a sheet-like sensor for which a spatial input for outputting a detection result in response to the movement of the palm of a driver's hand or a driver's finger can be detected after the driver's hand shades the capacitance sensor 12. An output signal provided from the capacitance sensor 12 is inputted to the control unit 14. The control unit 14 is an arithmetic unit including, for example, a CPU and memory for display control on the display device 16. The present embodiment can be achieved as an HMI control ECU 24 for input control on other vehicular apparatuses such as an air conditioner 18, an audio 20, and a navigation system 22.

According to the present embodiment, a button image is selected on the screen of the display device 16 in response to an input from the input device 10 through the HMI control ECU 24, and a signal is inputted to other vehicular apparatuses such as the air conditioner 18, the audio 20 and the navigation system 22 when the button image is detected. It is noted that the arrow illustrated in FIG. 1 indicates an I/O relation regarding a signal. The actual connection is not necessarily restricted to one-to-one connection through a cable for communication, and the connection may use vehicular network communication or wireless network.

Figure 2:
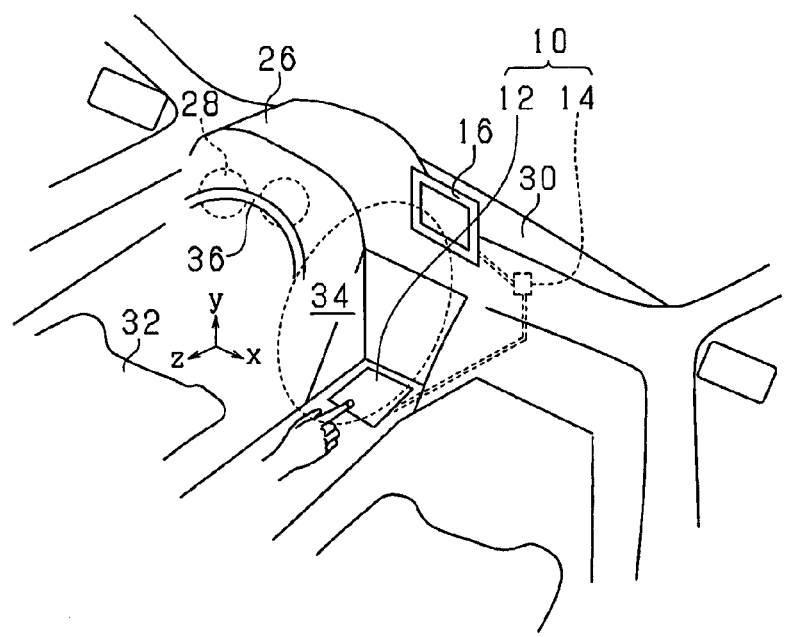
FIG. 2 is a perspective diagram that shows a vehicle cabin is equipped by the vehicular input device according to the first embodiment.

FIG. 2 is a perspective diagram that shows a cockpit module in a vehicle cabin equipped by the input device 10 according to the first embodiment. The capacitance sensor 12 according to the present embodiment is disposed at the bottom of the center console between a driving seat 32 and an assistant driver's seat. The display device 16 according to the present embodiment is disposed at the side of the meter hood 26 on an instrument panel 30, and is arranged near the center of a vehicle. In particular, the display device 16 is configured by, for example, a liquid-crystal panel or an organic EL panel. Additionally, the display device 16 is disposed approximately at the center of the upper part of the instrument panel 30 in a vehicular width direction, that is, at the front position of the upper part of the instrument panel 30 and the center console so that the screen faces the cabin of a vehicle. According to this arrangement, when a driver faces in a front direction, the display device 16 enters the driver's visual field.

In addition, by providing the capacitance sensor 12 at the bottom plane of the center console, the capacitance sensor 12 is arranged to face spacing 34 between the display device 16 and an occupant on the driving seat 32. The display device 16 displays an input screen image in which multiple button icons are in display. The control unit 14 outputs a signal that causes the display mode to change on the display device 16 in response to an output of the capacitance sensor 12 after an input operation performed by the driver is detected while the driver is looking at the input screen image.

According to the above configuration, a driver extends his or her finger into the spacing 34 between the display device 16 and the driver's seat 32, and the movement of the finger pointed toward the display device 16 is detected. Therefore, while the driver's line of sight faces toward the display device 16, an intuitive input operation can be performed on the display device 16 even if the driver's sitting position is away from the display device 16; or the correspondence relation between the direction of an input operation and an input result displayed on the display screen of the display device 16 in response to the input operation can also be easily interpreted.

In addition, the capacitance sensor 12 is a capacitance sensor including a sheet arranged with a plurality of conductors in a netlike appearance. With regard to the capacitance sensor, the capacitance between a conductor and the surrounding of the conductor changes as a hand moves closer to the conductors constituting the capacitance sensor. In a case of having self-capacitance sensor, the capacitance stored in the conductors increases as a hand moves closer to the electrode. However, in a case of having a mutual-capacitance sensor, the capacitance stored in the conductors decreases as a hand moves closer to the electrode.

Figure 3:
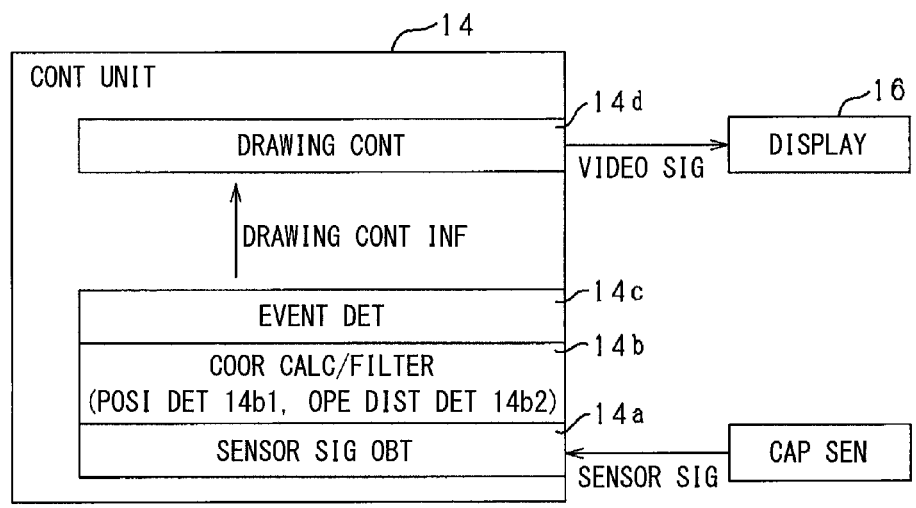
FIG. 3 is a diagram that shows the configuration of a control unit according to the first embodiment.

FIG. 3 is a diagram that shows the configuration of the control unit 14. The control unit 14 has a CPU which executes a variety of programs so as to achieve the functions of the after-mentioned sensor signal obtaining unit 14a, coordinate calculation and filtering unit 14b, event determining unit 14c and drawing control unit 14d.

The sensor signal obtaining unit 14a obtains a sensor signal from the capacitance sensor 12. The signal according to the present embodiment includes a capacitance value stored into conductors of a capacitance sensor and a position regarding the capacitance value. The coordinate calculation and filtering unit 14b includes a position detection unit 14b1 and an operation distance detection unit 14b2 that calculates a coordinate with a change in the capacitance value of a conductor in comparison with the absence of the driver's hand near the capacitance sensor constituting the capacitance sensor 12 and performs signal processing such as filtering regarding a capacitance value. More specifically, the position detection unit 14b1 detects a position where the finger tip of the operating finger projects on a sheet of the capacitance sensor 12 as a two-dimensional plane based on a change in capacitance. Additionally, the operation distance detection unit 14b2 detects the distance between the capacitance sensor and the operating finger.

The event determining unit 14c determines whether the present situation is in an idle state, a proximity state or a contact state. In addition, the present embodiment adopts a self-capacitance sensor in which the amount of variation in capacitance gets larger as the driver's hand moves closer to the capacitance sensor. Thus, the event determining unit 14c determines that the present situation is in a proximity state in which the driver's hand approaches to the capacitance sensor 12 when the amount of variation in capacitance is larger than a first threshold value and less than a second threshold value (i.e., the first threshold value<the second threshold value). Moreover, the event determining unit 14c determines that the present situation is in a contact situation in which the driver's hand touches the capacitance sensor 12 when the amount of variation in capacitance is larger than the second threshold value, and confirms the input of an icon for information input displayed on a position corresponding to the contact position on the display device 16.

The drawing control unit 14d performs control of drawing to be displayed on the display device 16 in response to the determination performed by the event determining unit 14c. For example, the icon used for the input of information for the display device 16 is not displayed when the present situation is in an idle state. In addition, the icon used for the input of information for the display device 16 is displayed when the present situation is in a proximity state. Moreover, the icon that has been selected is reversely displayed and then the control causing the screen to display in response to the content of processing subsequent to the processing of inputted information is performed when the present situation is in a contact state.

Figure 4:
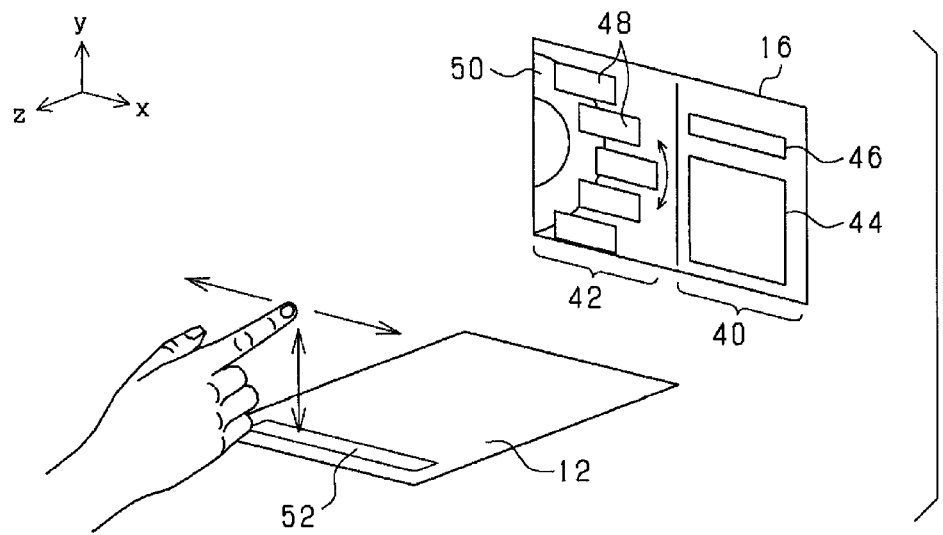
FIG. 4 is a diagram that shows an example of an input operation according to the first embodiment and an input screen image displayed on the display device.

FIG. 4 is a diagram that particularly illustrates the input operation detected by the capacitance sensor 12 according to the above-mentioned present embodiment and the transition of the input screen image on the display device 16 in response to the input operation. The input screen image exemplified in FIG. 4 is an input screen image related to an audio operation controlled by the control unit 14, and the input screen image is bisected into a right region 40 and a left region 42. The right region 40 includes a region 44 which displays the jacket photographs of a music album in play or the list of music songs included in the music album in play, and a region 46 which displays the album's name in play back or the name of a song in play back. At the left region 42, a plurality of rectangular regions 48 indicative of names of other selectable music albums are lined up vertically. The plurality of rectangular regions 48 are lined up along a half-moon shaped guiding line 50 at substantially equal intervals so as to form an arc.

The control unit 14 estimates the horizontal position (in an X-direction in FIG. 4) of the driver's finger and the separation distance (in a Y-direction-direction in FIG. 4) between the driver's finger and the capacitance sensor 12 based on the output of the capacitance sensor 12 and moves the rectangular region 48 in an arrow direction along the guiding line 50 in synchronization with the horizontal movement of the driver's finger. Thus, the driver extends his or her hand to the top of the capacitance sensor 12 and moves the fingertip horizontally so that one region can be selected from the plurality of rectangular regions 48 (i.e., an icon image indicative of a music album's name) lined up vertically for playing a next music album.

It is noted that the capacitance sensor 12 includes a plurality of first conductors 54 lined up in a vehicular front-back direction and a plurality of second conductors 56 which intersect the plurality of first conductors 54. The control unit 14 estimates the separation distance between the capacitance sensor 12 and the driver's finger based on the amount of charge stored in conductors 54a, which are mainly arranged at the back side of a vehicle, of the plurality of first conductors 54 lined up in a front-back direction. In addition, the control unit 14 estimates the position of the driver's finger in a direction perpendicular to the front-back direction of the vehicle based on the difference regarding the amount of charges respectively stored in the plurality of second conductors 56. Specifically, if the panel having a sheet-liked capacitance sensor 12 is arranged substantially vertically, the direction orthogonal to the front-back direction of the vehicle corresponds to the up-down direction of the vehicle. In addition, if the panel having a sheet-liked capacitance sensor 12 is arranged substantially horizontally, the direction orthogonal to the front-back direction of the vehicle corresponds to the left-right direction of the vehicle. Thus, it is possible to detect the vehicular horizontal position or the vehicular vertical position regarding the driver's finger.

The method in which the above-mentioned position detection unit 14b1 detects the horizontal position of the driver's fingertip based on the amount of variation in capacitance is described with reference to FIG. 9. The horizontal axis of the graph illustrated in FIG. 9 indicates a horizontal displacement (i.e., X-direction in FIG. 4), the positions of the conductors arranged at the left edge of the capacitance sensor 12 is set to be zero.

Figure 9:
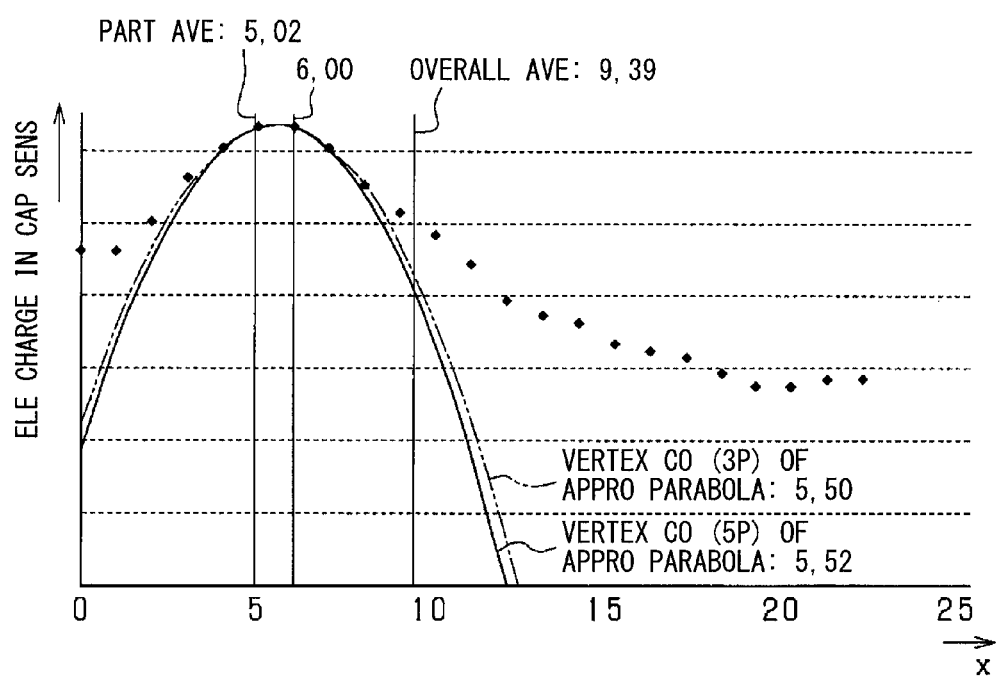
FIG. 9 is a diagram that illustrates positional estimation in a vertical direction regarding the driver's finger based on the amount of an electrical charge stored in each of the second conductors in the capacitance sensor.

In addition, the vertical axis of the graph shown in FIG. 9 indicates the amount of charge stored between the driver's finger and the second conductor 56 in a case of using a self-capacitance sensor. Moreover, the diamond-shaped marker in the graph illustrated in FIG. 9 indicates the amount of charge stored in each of the second conductors 56.

The position detection unit 14b1 according to the present embodiment initially extracts the amount of charge in three or five second conductors 56 around the second conductor 56 which store even larger amount of charge, and consequently approximates a curve connecting the points representing the values of the amount of charge with a parabola formed to be convex. Then, the position detection unit 14b1 estimates the horizontal position of the driver's finger with the use of a vertex coordinate (i.e., 5.50 or 5.52) of the approximated parabola. Therefore, as comparing the case of averaging horizontal positions based on the charge stored in all second conductors 56 (i.e., 9.39) with the case of averaging horizontal positions based on the charge stored in a part of second conductors 56 (i.e., 5.02), it is possible to obtain more accurate values.

When the control unit 14 determines that the spacing between the capacitance sensor 12 and the driver's finger is shorter than a predetermined threshold value, the control unit 14 determines that an input has been determined on an icon image regarding a music album indicated by a rectangular region under selection and consequently confirms the input so as to change the display mode of the right region 40. The predetermined threshold value, which is compared with the separation distance between the capacitance sensor 12 and the driver's finger for confirming an input, is preferably to be configured as a distance such that the driver exactly touches the capacitance sensor 12 with his or her finger so as to inhibit an improper operation of the driver.

In addition to the selection and determination of a music album, the selection and determination of a musical piece in music albums may also be carried out based on a signal detected by the capacitance sensor 12. In this situation, a switching button for switching between two modes, that is, a music album selection mode and a musical piece selection mode may be provided on an operation screen (i.e., Graphical User Interface (GUI)). For example, when a music album is selected, a transition to the musical piece selection mode is automatically made. The transition from the music album selection mode to the musical piece selection mode may display, for example, an image of a switching button indicative of switching to the music album selection mode at the end of a music list.

Although the present disclosure may not be restricted to the GUI illustrated in FIG. 4, the driver performs an aerial operation by horizontally moving his or her fingertip extended toward the display device 16 to select one of the plurality of rectangular regions 48 (i.e., icon images) lined up vertically depicting an arc and perform the operation of confirming an selection input by moving his or her fingertip to the bottom in a series of flow.

In the present embodiment, when the driver extends his or her hand or finger toward the display device, the present embodiment focuses on the matter in that the opposite area regarding the root side of the driver's finger opposite to an edge region 52 in the front of the capacitance sensor (i.e., at the back side of a vehicle) or the driver's palm is without being much influenced by the position of the driver's hand or the length of the driver's finger so as to ensure a certain size, and uses a predetermined constant as an opposite area regarding the root side of a finger opposite to the edge region 52 in front of the capacitance sensor or the palm of a driver's hand.

Figure 5:
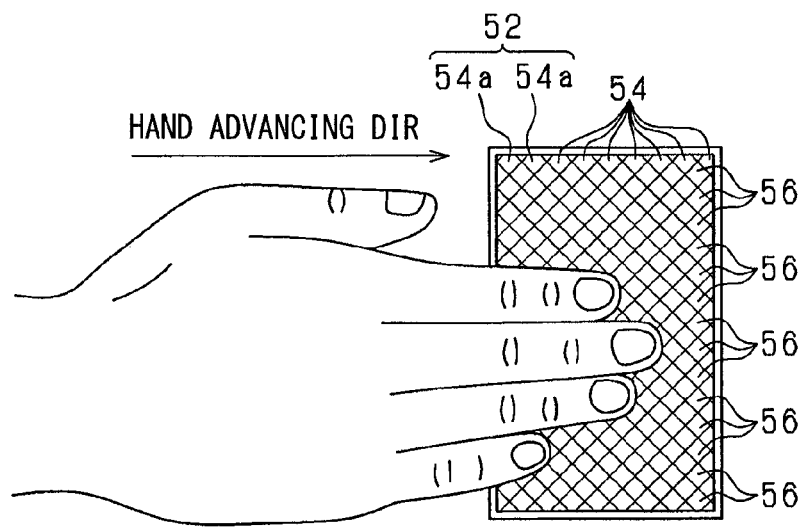
FIG. 5 is a diagram that shows a detection unit and the advancing direction of the driver's hand according to the first embodiment.
Figure 8:
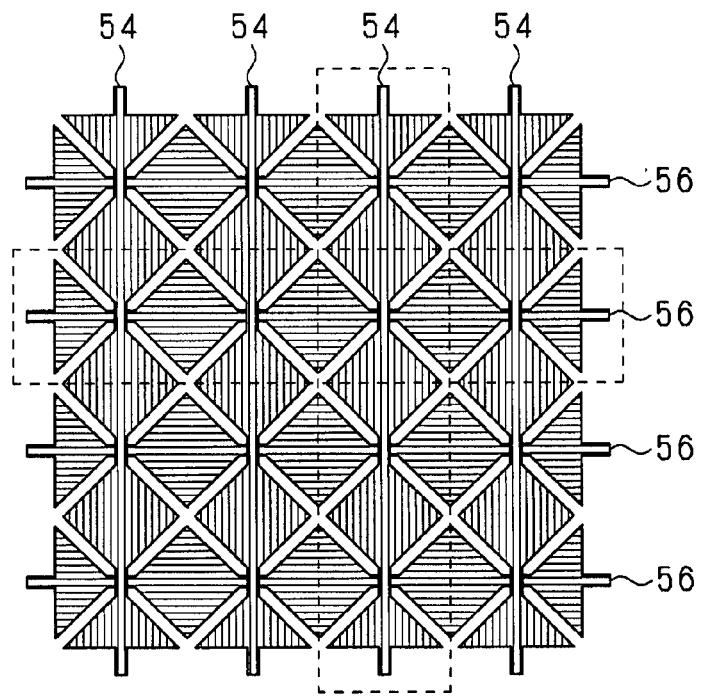
FIG. 8 is an enlarged diagram that shows first electrodes and second electrodes in a capacitance sensor according to the above embodiments.

FIG. 5 is a diagram that illustrates the capacitance sensor 12 according to the present embodiment and a moving direction regarding a driver's hand. The capacitance sensor 12 according to the present embodiment is configured by a plurality of first conductors 54 in a manner that a plurality of diamond-shaped patterns are lined up in a front-back direction and a plurality of horizontal electrodes 56 in a manner that a plurality of diamond-shaped patterns are lined up horizontally (see FIG. 8). The edge region 52 at the front side is configured by conductors 54a arranged at the back of the vehicle among the vertical electrodes arranged to be lined up in a front-back direction of the vehicle. The control unit 14 estimates the amount of an electrical charge stored in the conductors 54a arranged mostly at the back side of the vehicle and the separation distance between the capacitance sensor 12 and the driver's finger based on a parameter, which is preliminarily set, indicative of an opposite area between the finger and the edge region 52 of the capacitance sensor 12.

Consequently, the horizontal position (i.e., X-direction in FIG. 4) of a finger is estimated based on the area of the second conductor 56 where an electrical charge is unevenly stored, and the separation distance (i.e., Y-direction in FIG. 4) between the finger and the capacitance sensor is estimated based on the amount of an electrical charge stored in the edge region 52 in front of the capacitance sensor so that the movement of a finger can be accurately detected.

It is noted that the above embodiment detects the separation distance between the driver's finger and the capacitance sensor 12 in Y-direction based on the amount of an electrical charge stored in the capacitance sensor. However, in a case where the capacitance sensor 12 has a function for outputting the number of contact points, it can be determined whether the driver touches the sheet as the capacitance sensor 12 with his or her finger based on a signal indicative of the number of contact points in addition to the estimation of separation distance by using the capacitance.

According to the above-mentioned the first embodiment, the following effects can be generated.

A driver performs an input operation with his or her hand away from the display device 16 and easily realizes the correspondence between the input operation and the input of information in response to the input operation.

The contact against the capacitance sensor is set as an input determination of the icon image, therefore, the present embodiment provides operational feeling for the driver, and an input operation through sliding while making a contact can be performed.

With regard to the capacitance sensor, the distance is detected based on a change in an electrical charge stored in the conductors at a part near the moving direction regarding the driver's hand so that the operational distance between the capacitance sensor and the hand can be detected with a higher precision.

Second Embodiment

Figure 6:
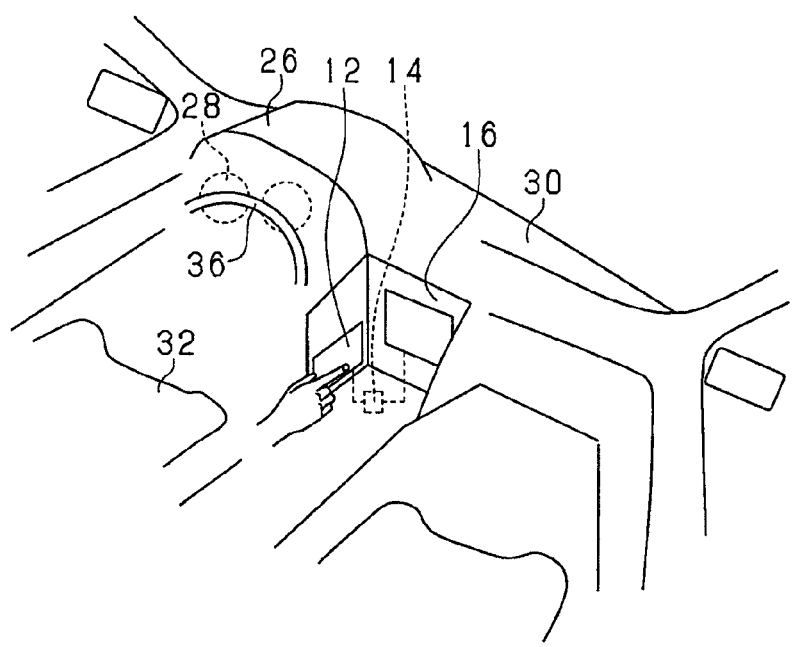
FIG. 6 is a perspective diagram that shows a vehicle cabin is equipped by a vehicular input device according to a second embodiment.

FIG. 6 is a perspective diagram that shows a vehicle cabin is equipped by a vehicular input device according to a second embodiment. A capacitance sensor 12 according to the second embodiment is put up on a wall erected at the side surface of a center console in the cabin of a vehicle, and is arranged substantially vertically. A plurality of second conductors 56 are lined up in a vehicular up-down direction. A control unit 14 estimates the vertical position of the driver's finger based on the difference of electrical charges stored in the plurality of second conductors 56.

The display device 16 according to the second embodiment is arranged at the center console. It is noted that GUI displayed on the display device 16 is similar to the one in the above-mentioned the first embodiment.

Third Embodiment

Figure 7:
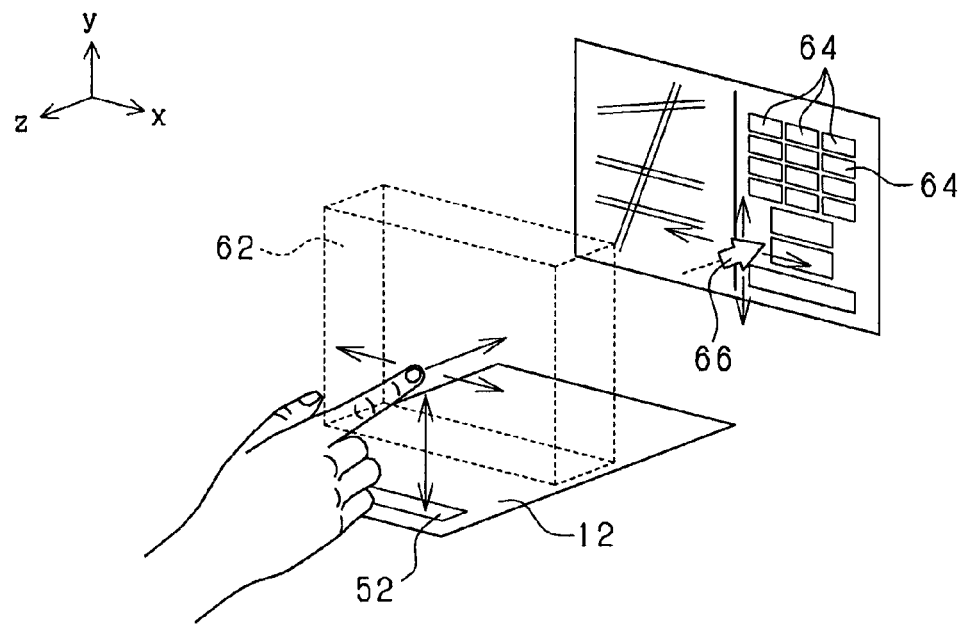
FIG. 7 is a diagram that shows a selecting operation on an input device according to a third embodiment.

FIG. 7 is a diagram that shows an input device according to a third embodiment. In the first and second embodiments, with regard to an aerial operation by moving a fingertip horizontally or vertically, one of a plurality of icon images lined up vertically is selected, and the fingertip moves closer to the capacitance sensor 12 and then an input selection is confirmed. However, the present embodiment carries out a selection input through an aerial operation by moving a fingertip vertically and horizontally, and a selection input is confirmed by further moving the fingertip forward.

Specifically, the control unit 14 illustrated in FIG. 7 causes a plurality of icon images 64 or a cursor 66 to be displayed as a display input screen image of the display device 16. The space between the display device 16 and the driving seat 32 is substantially perpendicular to the sheet surface of the capacitance sensor 12. A virtual input plane 62 is configured such that the distance from the display device 16 corresponds to a predetermined range in the space, and the position of the driver's finger is estimated on the virtual input plane 62 based on the output of the capacitance sensor 12. Then, one icon image is selected from the plurality of icon images 64 in response to the estimated finger's position.

Therefore, one icon image can be selected from the plurality of icon images 64 lined up two-dimensionally so that an input to a complicated system in comparison with the above embodiment can be performed. In addition, the determination of a selection input according to the third embodiment is the matter in that the driver's finger passes through the virtual input plane 62 and advances to the side of the display device 16. That is, when the distance between the display device 16 and the finger is closer to the predetermined range, the input to the icon image 64 is selected in response to the position of the driver's finger on the virtual input plane 62. Thus, an input to the icon image under selection based on a signal from the detection unit can be confirmed without the need to provide a determination button or the like separately. It is noted that the horizontal position of a finger (i.e., Y-direction in FIG. 7) may be estimated based on the amount of an electrical charge stored in the edge region 52 in the front of the capacitance sensor that is identical to the above-mentioned embodiment.

Other Embodiment

In the above-mentioned embodiments, the capacitance sensor 12 is configured by one capacitance sensor; however, the present disclosure is not restricted to this matter. The capacitance sensor 12 may be configured by a sheet having a plurality of capacitance sensors.

In the above embodiments, a capacitance sensor having a diamond array which arranges and laminates self-capacitance diamond-shaped conductors is used as the capacitance sensor 12; however, the present disclosure is not restricted to this matter. The capacitance sensor 12 may be configured by a capacitance sensor having a Manhattan array that arranges and laminates linear conductors on a game board, or other spatial input devices such as an infrared-light sensor, laser sensor or camera.

The present disclosure has the following aspects.

According to an aspect of the present disclosure, a capacitance sensor is configured by a plurality of first conductors lined up at least in a vehicular front-back direction. The present disclosure estimates the distance between the capacitance sensor and a driver's hand based on an electrical charge stored in a part of the plurality of first conductors mainly arranged at the back side of a vehicle. Accordingly, the distance between capacitance sensor and the driver's fingertip can be estimated with a higher accuracy.

Alternatively, the capacitance sensor may include a plurality of second conductors intersecting the plurality of first conductors, and the control unit may estimate the position of the driver's finger in a direction perpendicular to a vehicular front-back direction based on the difference of the amount of an electrical charge respectively stored in each of the plurality of second conductors. Accordingly, the position of the driver's finger may be estimated not only in a vehicular front-back direction but also in a direction perpendicular to a vehicular front-back direction. The position of the driver's finger in the direction perpendicular to the vehicular front-back direction may be more preferable to be a vehicular vertical position or a vehicular horizontal position.

Alternatively, the control unit may control a display device based on a change in at least of the separation distance, the front-back position and the position of the driver's finger in the direction perpendicular to the vehicular front-back direction.

Alternatively, the control unit may control the display device to display a plurality of icon images lined up vertically, select one of the plurality of icon images lined up vertically based on a change in the position of the driver's finger in the direction perpendicular to the vehicular front-back direction, confirm an input to the selected icon image in a case where the separation distance is shorter than a predetermined threshold and consequently changes a display mode of the display device. Accordingly, it is possible to perform a series of operation that selects one of the plurality of icon images lined up vertically by extending the driver's finger to the display device and confirms the input.

Alternatively, the control unit may control the display device to display a plurality of icon images lined up in two-dimensionally, sets a virtual input plane, which is perpendicular to the capacitance sensor and perpendicular to the vehicular front-back direction, in a region adjacent to the capacitance sensor, estimate the position of the driver's finger on the virtual input plane based on the separation distance and the position of the finger's driver in the direction perpendicular to the vehicular front-back direction, and select one of the plurality of icon images in response to the position of the driver's finger on the virtual input plane. Accordingly, since it is configured to select one of the plurality of icon images lined up not only in a vertical direction but also in two-dimension, it is possible to perform an input to a more complicated operation system.

Alternatively, the display device may be arranged at an instrument panel of the vehicle, and the control unit may determine whether the driver's finger passes through a predetermined range including the virtual input plane and approaches to the display device, and confirm an input to the icon image selected in response to the position of the driver's finger on the virtual input plane and consequently changes a display mode of the display device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claim is:

1. A vehicular input device mounted to a vehicle, comprising:
    a capacitance sensor that includes a plurality of first conductors lined up in a vehicular front-back direction; and
    a control unit that estimates a separation distance between the capacitance sensor and a driver's finger based on an amount of an electrical charge stored in a part of the plurality of first conductors arranged at a back side of the vehicle, and estimates a front-back position of the driver's finger on the capacitance sensor based on a difference of the amount of an electrical charge respectively stored in each of the plurality of first conductors and based on a predetermined value, wherein
    the predetermined value indicates an opposite area formed by a driver's fingertip on the part of the plurality of first conductors arranged at the back side of the vehicle, or the predetermined value indicates an opposite area formed by a driver's palm on the part of the plurality of first conductors arranged at the back side of the vehicle.

2. The vehicular input device according to claim 1, wherein the capacitance sensor includes a plurality of second conductors intersecting the plurality of first conductors, and
    wherein the control unit estimates a position of the driver's finger in a direction perpendicular to the vehicular front-back direction based on a difference of an amount of an electrical charge respectively stored in each of the plurality of second conductors.

3. The vehicular input device according to claim 2, wherein the position of the driver's finger in the direction perpendicular to the vehicular front-back direction corresponds to a vehicular horizontal position or a vehicular vertical position.

4. The vehicular input device according to claim 2, wherein the control unit controls a display device mounted to the vehicle based on a change in at least one of the separation distance, the front-back position and the position of the driver's finger in the direction perpendicular to the vehicular front-back direction.

5. The vehicular input device according to claim 4, wherein the control unit:
    controls the display device to display a plurality of icon images lined up vertically;
    selects one of the plurality of icon images lined up vertically based on a change in the position of the driver's finger in the direction perpendicular to the vehicular front-back direction; and
    confirms an input to the one of the icon images under selection and consequently changes a display mode of the display device when it is determined that the separation distance is shorter than a predetermined threshold.

6. The vehicular input device according to claim 4, wherein the control unit:
    controls the display device to display a plurality of icon images lined up two-dimensionally;
    sets a virtual input plane, which is perpendicular to the capacitance sensor and perpendicular to the vehicular front-back direction, in a region adjacent to the capacitance sensor;
    estimates the position of the driver's finger on the virtual input plane based on the separation distance and the position of the finger's driver in the direction perpendicular to the vehicular front-back direction; and
    selects one of the plurality of icon images in response to the position of the driver's finger on the virtual input plane.

7. The vehicular input device according to claim 6, wherein the display device is arranged at an instrument panel of the vehicle, and
    wherein the control unit:
    determines whether the driver's finger passes through a predetermined range including the virtual input plane and approaches to the display device; and
    confirms an input to the one of the icon images under selection in response to the position of the driver's finger on the virtual input plane and consequently changes a display mode of the display device.

* * * * *